US007703958B2

(12) United States Patent
Christoff

(10) Patent No.: US 7,703,958 B2
(45) Date of Patent: Apr. 27, 2010

(54) QUICK RELEASE ILLUMINATING AND DISPLAY APPARATUS AND SYSTEM

(76) Inventor: Gary Christoff, 10720 Lakewood Blvd. Apt. 104, Downey, CA (US) 90241

( * ) Notice: Subject to any disclaimer, the term of this patent is extended or adjusted under 35 U.S.C. 154(b) by 277 days.

(21) Appl. No.: 11/894,943

(22) Filed: Aug. 23, 2007

(65) Prior Publication Data

US 2009/0052198 A1 Feb. 26, 2009

(51) Int. Cl.
*B60Q 1/00* (2006.01)

(52) U.S. Cl. ................... 362/500; 301/37.101; 362/543

(58) Field of Classification Search ................. 362/500, 362/543, 103, 42; 301/37.101, 37.105
See application file for complete search history.

(56) References Cited

U.S. PATENT DOCUMENTS

| | | | | |
|---|---|---|---|---|
| 3,113,727 | A | 12/1963 | Bradway | |
| 5,392,200 | A * | 2/1995 | Milde | 362/464 |
| 6,168,301 | B1 | 1/2001 | Martinez et al. | |
| 6,565,243 | B1 * | 5/2003 | Cheung | 362/500 |
| 6,663,187 | B2 | 12/2003 | Fitzgerald | |
| 6,945,609 | B2 | 9/2005 | Barney | |
| 7,111,967 | B2 | 9/2006 | Terry | |
| 7,150,549 | B2 * | 12/2006 | Olds et al. | 362/500 |
| 2003/0169595 | A1 | 9/2003 | Lee | |
| 2004/0042227 | A1 | 3/2004 | Gloodt et al. | |
| 2006/0044817 | A1 | 3/2006 | Terry | |
| 2006/0214500 | A1 | 9/2006 | Hall et al. | |
| 2007/0058384 | A1 | 3/2007 | Khan | |

* cited by examiner

*Primary Examiner*—Gunyoung T Lee
(74) *Attorney, Agent, or Firm*—Robert J. Lauson; Lauson & Tarver LLP

(57) ABSTRACT

A quick release illuminating and display apparatus and system for vehicles and structures to provide lighting and illumination effects and to display data or other information on a display screen. The apparatus and system includes a removable housing assembly with illumination sources, a power source and an optional display screen to provide lighting to accent a vehicle or structure and to display data, pictures or other information. The apparatus and system includes a quick release mechanism with a biasing cam operably connected to a number of biased lock shafts. The controlled movement of the biasing cam operates so as to quickly lock or unlock the housing assembly onto or off of the support structure. The apparatus and system has enhanced lighting and display effects by the use of optional ball bearings, a cap to exhibit team or manufacturer logos, the use of LED lights secured to directional nipples, a display screen, a USB port, computer memory, a control switch, remote control operation and solar power.

20 Claims, 5 Drawing Sheets

10
12
14
16
18
20
22
24
30
32
34
36
38
40
42
44
50
52
54

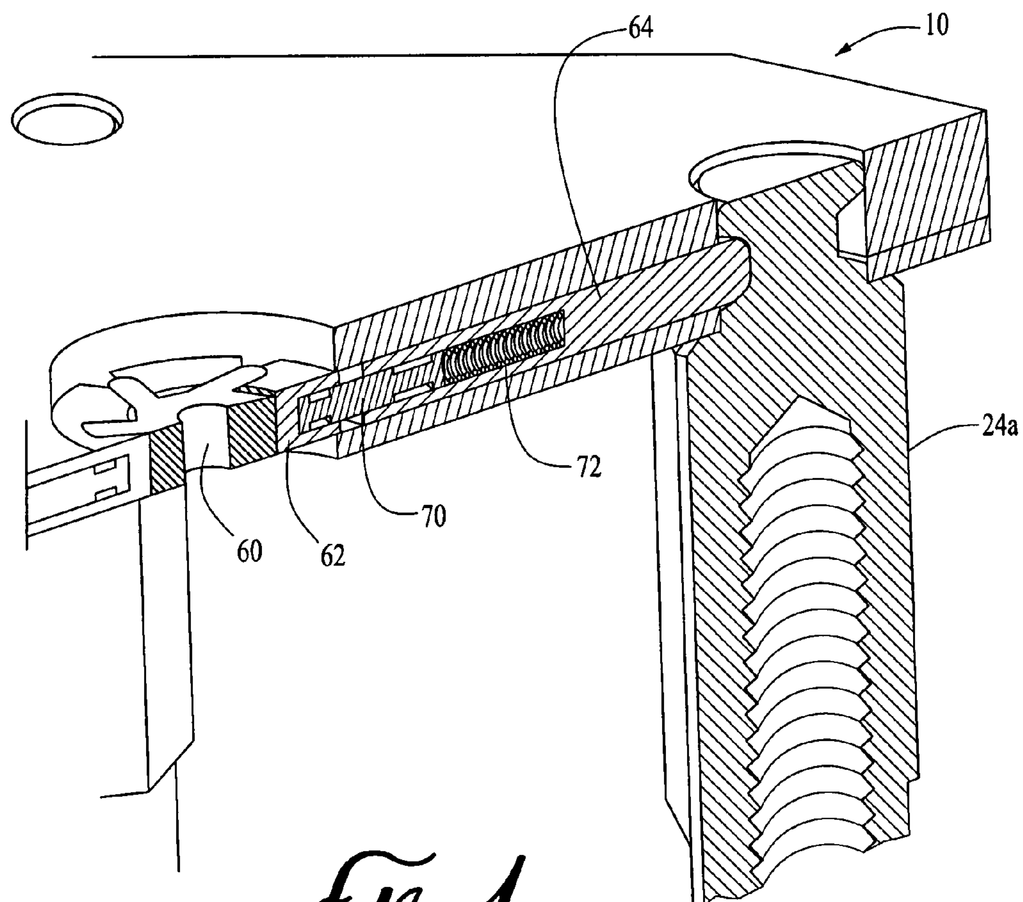
FIG. 4
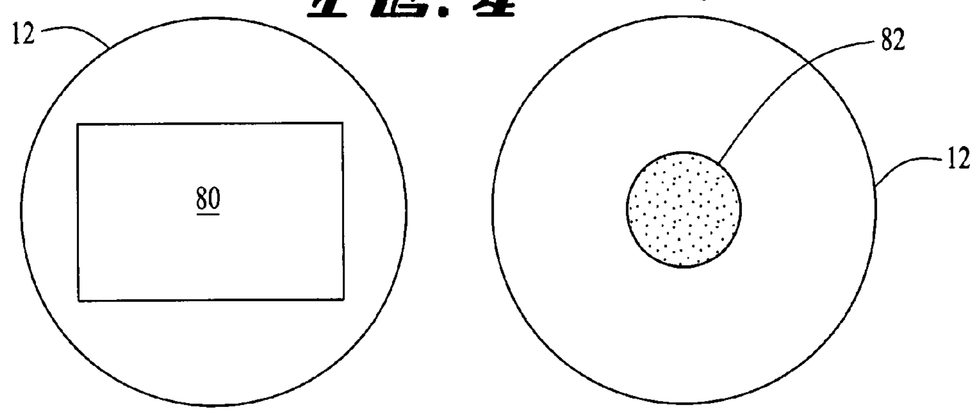
FIG. 5A
FIG. 5B
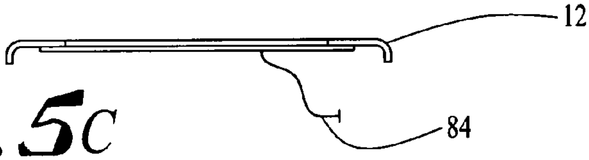
FIG. 5C 90
92
10
30
30
10
80

QUICK RELEASE ILLUMINATING AND DISPLAY APPARATUS AND SYSTEM

BACKGROUND OF THE INVENTION

1. Field of the Invention

This present invention relates to a quick release illuminating and display apparatus and system that can be used in connection with vehicles and structures for controlled lighting effects or to display information.

2. Description of Related Art

There are various types of apparatus and systems that can be used to provide controlled lighting effects or to display information on vehicles or other structures. Conventional lighting and display devices have many drawbacks including cumbersome installation and removal procedures, limited operational features and difficult repair and replacement procedures. In addition, conventional devices have a limited functionality and generally do not allow for adding or modifying the illumination effects or the information or data to be displayed on a screen.

For example, U.S. Pat. No. 7,111,967 to Terry discloses a vehicle hub light with multi-colored LED's powered by a battery or a solar power source and a remote control. U.S. Pat. No. 6,116,763 to King discloses a conventional wheel illumination apparatus with a Faraday-type generating device to illuminate LED's on the wheel hubs. However, the Terry and King devices do not disclose or suggest a quick release apparatus as in the present invention and do not disclose the illuminating and display features of the present invention. A need exists for a quick release illuminating and display apparatus and system that can be used in a wide variety of applications and overcomes the limitations of and problems with conventional devices.

SUMMARY OF THE INVENTION

A quick release illumination and display apparatus and system for vehicles and structures to provide lighting and illumination effects and to display data, pictures or other information on a display screen. Embodiments of the invention include a removable housing and a light assembly coupled to a power source to provide controlled illumination and lighting for lighting effects. The invention has a quick release mechanism that includes a biasing cam operably connected to a number of lock shafts. The lock shafts are biased by the biasing cam so as to lock onto lug bolts when the biasing cam is in a locked position. Movement of the biasing cam out of the locked position causes the lock shafts to unlock from the lug bolts thereby allowing the housing member to be released from the supporting structure, such as vehicle wheel lug bolts or other supporting structure.

In additional embodiments, the lock shafts are operably biased to the adjoining lug bolt by a biased spring and a cam follower. Embodiments of the invention include a hub backing plate and a hub base that may be separated by ball bearings to provide further varying illumination effects. Embodiments include a cylinder lock to lock or unlock the biasing cam, a display cap for exhibiting team or manufacturer logos, the use of LED lights including LED lights secured to directional nipples for directional lighting effects, a display screen in addition to the lighting, the use of a key to operate the quick release mechanism, a switch to activate the light assembly in different operating or ON modes to change the lighting pattern, and a remote control to activate the light assembly or the display screen by wireless signals.

Embodiments include a solar power source, a faraday device or a plug connected to an external power source and including a port so that the power source is rechargeable. Additional embodiments include the use of lug bolts having extended lengths to contact the lock shafts. In other embodiments, the display screen is a liquid crystal display (LCD) or other electronic display screens to illustrate data or other information. In further embodiments, the housing member includes a USB port, computer memory and means wherein data is exchanged between an external recording device and the computer memory for display of the data on the display screen. Other and further advantages, improvements and embodiments will be apparent to skilled persons from the figures and disclosure herein.

BRIEF DESCRIPTION OF THE DRAWINGS

FIG. 4 is a cross section view illustrating an embodiment of the attachment used for the illumination and display apparatus and system of the present invention.

FIG. 5A is an illustration of the optional LCD screen in one embodiment of the illumination and display apparatus and system of the present invention.

FIG. 5B is an illustration of the optional solar cell in one embodiment of the illumination and display apparatus and system of the present invention.

FIG. 5C is a cross sectional view of the optional USB plug for one embodiment of the illumination and display apparatus and system of the present invention.

DETAILED DESCRIPTION OF THE INVENTION

Figure 1:
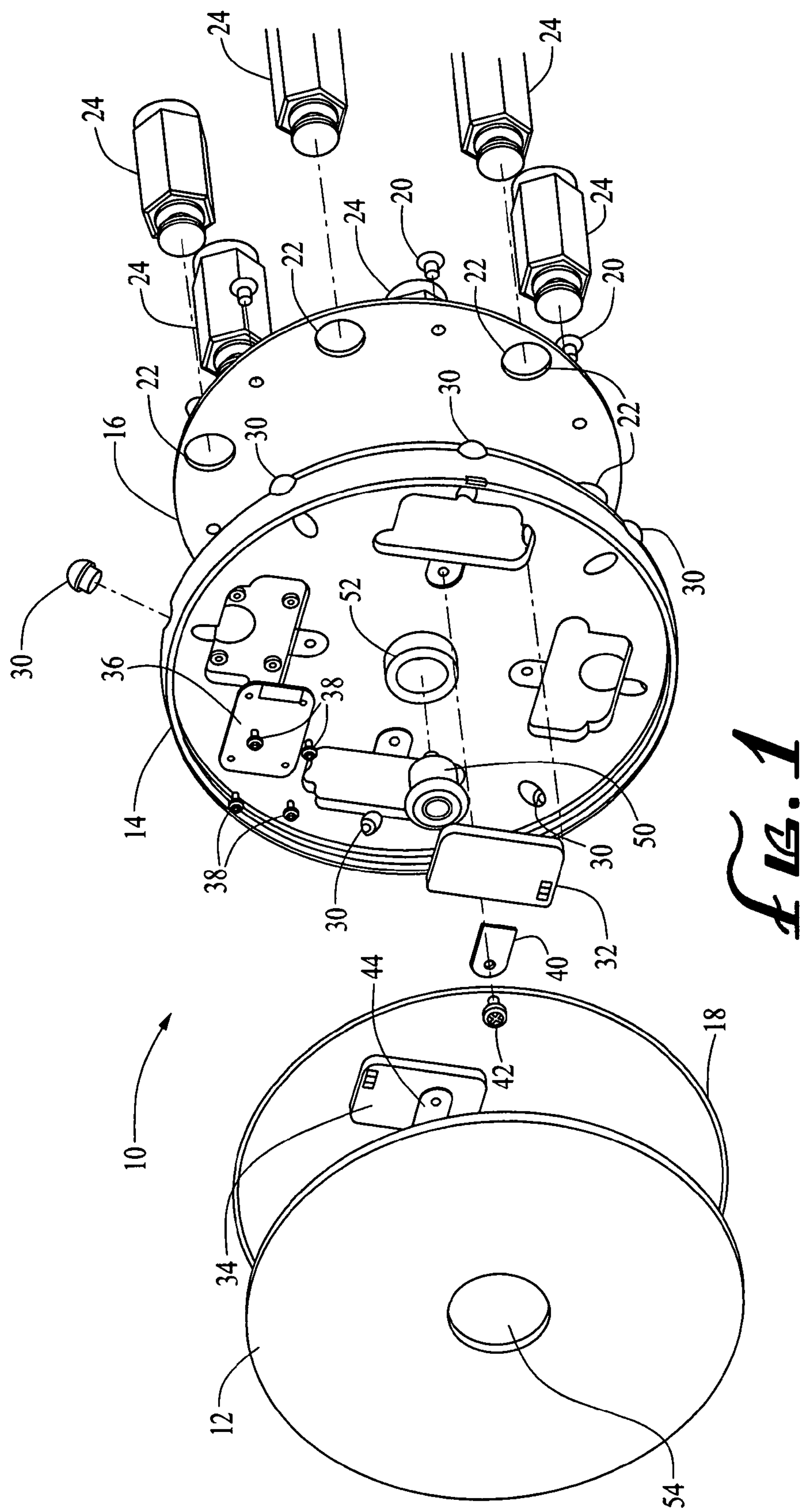
FIG. 1 is an exploded view of one embodiment of the illumination and display apparatus and system of the present invention.

FIG. 1 shows an exploded view of an embodiment of the illumination and display apparatus 10 of the present invention. The apparatus 10 includes the hub base 14 sandwiched between the hub cap 12 and the hub backing plate 16 when assembled. The hub cap 12 is attached to the hub base 14 by convention attachments such as press fitting with a hub cap retaining o-ring 18 placed therebetween as shown in FIG. 1.

The hub backing plate 16 is secured to the hub base 14 by retaining screws 20 or other conventional connectors or attachments known to persons skilled in the art. The hub backing plate 16 includes one or more openings 22 which are adapted to fit onto lug nuts 24 or other retaining devices known to skilled persons that will support the apparatus 10. In one embodiment, the hub backing plate 16 and the hub base 14 are separated by ball bearings.

Figure 2:
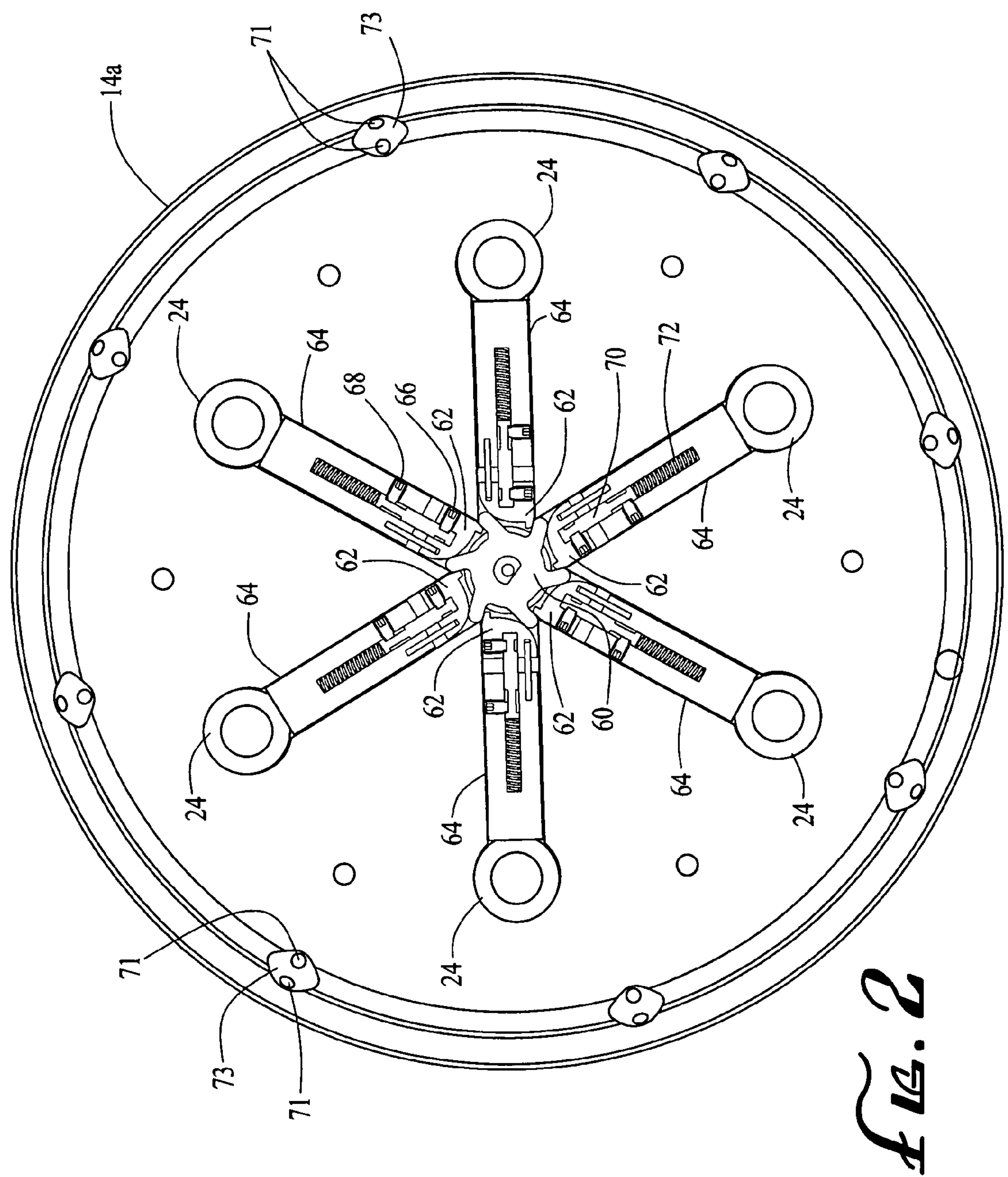
FIG. 2 is an illustration of one embodiment of the attachment used for the illumination and display apparatus and system of the present invention.

The hub base 14 includes one or more illumination sources 30 which may be a light emitted diode ("LED"), a combination of light emitting diodes or other sources of light. The hub base 14 also includes battery 32 and battery 34 and the printed circuit board 36. The battery 32 and battery 34 are electrically coupled to the printed circuit board 36 and to the illumination sources 30 through circuitry known to skilled persons to provide electricity to the illumination sources 30 so the illumination sources 30 can provide light. The illumination sources 30 are also shown in one embodiment in FIG. 2 as one or more LEDs 71 attached to a directional nipple 73 and placed around the modified hub base 14*a* as shown in FIG. 2.

The printed circuit board 36 is removably secured to the hub base 14 by retaining screws 38 as shown in FIG. 1. The battery 32 is removably attached to the hub base 14 by battery retainer 40 by screw 42 and the battery 34 is removably attached to the hub base 14 by battery retainer 44 and a screw (not shown). The battery 32 and battery 34 include convention alkaline or lithium batteries and includes other batteries types, including rechargeable batteries and other electrical power sources known to skilled persons.

The apparatus 10 includes a charging port in one or more embodiments so that an external battery charger or similar apparatus can be attached thereto to recharge battery 32 and battery 34. A switch can activate the operation of the illumination sources 30 in a controlled manner. For example, in one embodiment, the switch has: the ON 1 position to activate illumination of every other one of the illumination sources 30 shown in FIG. 1 and FIG. 2; the ON 2 position to activate illumination of all of the illumination sources 30 shown in FIG. 1 and FIG. 2; and the OFF position where none of the illumination sources 30 are lighted.

In one or more embodiments, a hub lock 50 is provided which fits into the central aperture 52 of the hub base 14 and which can be accessed through the central opening 54 of the hub cap 12 to secure the apparatus 10 onto the lug nuts 24 in connection with further embodiments of the invention described herein. The hub lock 50 includes all types of locking mechanisms including a conventional cylinder lock and other locks known to persons skilled in the art.

Figure 3:
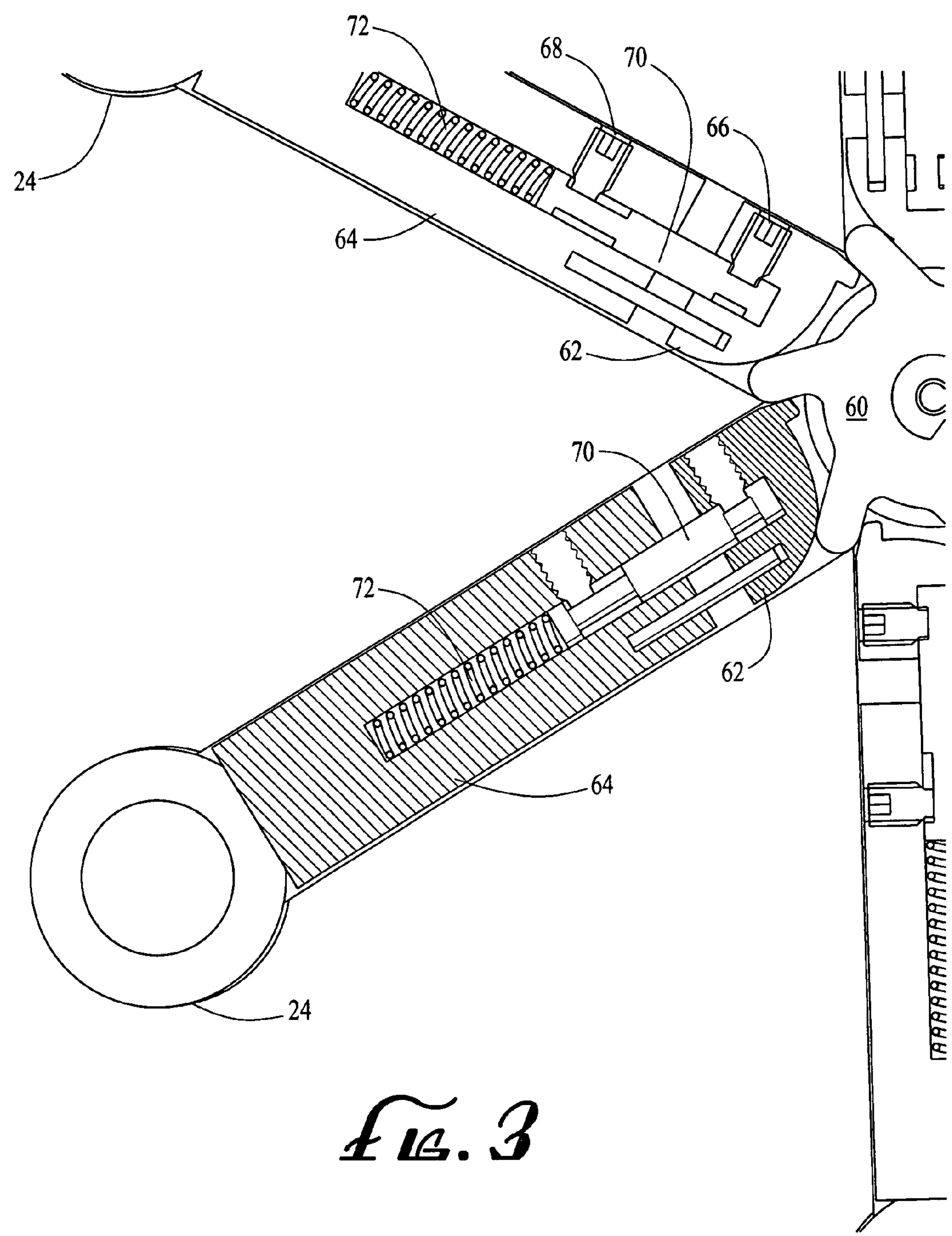
FIG. 3 is another illustration of one embodiment of the attachment used for the illumination and display apparatus and system of the present invention.

FIG. 2 and FIG. 3 show an embodiment illustrating one attachment for the illumination and display apparatus 10. The hub base 14*a* includes the biasing cam 60 which is in contact with a plurality of cam followers 62 arranged around the biasing cam 60. Each of the biasing cams 62 is in communication with a lock shaft 64 as shown in FIG. 2. FIGS. 2 and 3 show one embodiment with six lock shafts 64 however, the present invention includes the use of a different number of the individual cam followers 62 and lock shafts 64 for particular lug nut 24 configurations.

The cam follower 62 includes a first set screw 66 and the lock shaft 64 includes a second set screw 68. A compression shaft 70 is placed between the cam follower 62 and the lock shaft 64 within hollowed-out portions of each and a spring 72 is placed at the end of the hollowed out portion of the lock shaft 64 as shown in FIG. 2 and FIG. 3.

In this embodiment, when the biasing cam 60 is rotated in the clockwise direction in FIG. 2, also as illustrated in FIG. 3, the cam follower 62 follows the cam profile of the biasing cam 60 and pushes the lock shaft 64 toward the lug nut 24 by a force applied to spring 72 through the compression shaft 70. The compression shaft 70 thereby acts as a plunger to compress the spring 72. The compression shaft 70 slides in the lock shaft 64 but is fixed to the cam follower 62 by the first set screw 66 as shown in FIG. 3. The second set screw 68 limits the travel of the lock shaft 64 by virtue of the slotted configuration of the lock shaft 64. With the spring 72 compressed, the apparatus 10 can be securely attached to the lug bolts 24 by the force applied by the lock shaft 64 to each of the lug nuts 24.

When the biasing cam 60 is thereafter rotated counterclockwise for the embodiment in FIG. 2 and FIG. 3, the spring 72 is decompressed as the lock shaft 64 slides away from the lug nut 24. Although the lock shaft 64 is still in contact with the lug nut 64 as a result of the spring 72, the apparatus 10 is more loosely attached to the lug bolts 24 and the apparatus 10 may be removed from the lug nuts 24 or other retaining devices used to mount the apparatus 10. In one or more embodiments, a key is used to rotate the biasing cam 60 such as a key inserted into the hub lock 50 although other and different types of keys known to skilled persons are included within the scope of the present invention.

FIG. 3 is a detailed section view of the cam follower 62, the lock shaft 64, the compression shaft 70 and spring 72 along with the first set screw 66 and second set screw 68. As illustrated in FIG. 3, the spring 72 allows for continuous contact between the lock shaft 64 and the lug nut 24 because the second set screw 68 limits the travel of the lock shaft 64 and also can accommodate manufacturing tolerances in patterns of the lug bolts 24.

FIG. 4 shows a cross sectional view of one embodiment illustrating the biasing cam 60 and the cam follower 62 with the compression shaft 70, the spring 72 and the lock shaft 64. The apparatus 10 can be secured to extended lug nuts 24*a* such as illustrated in FIG. 4.

FIG. 5A illustrates an embodiment with a display screen 80 that is attached to the exterior of the apparatus 10 such as on the hub cap 12. The display screen can be any type of display device including a liquid crystal display (LCD) or other device for displaying data, images or other information known to persons skilled in the art.

FIG. 5B shows an embodiment with at least one solar or photovoltaic cell 82 that can be utilized to provide electrical power for the apparatus 10 or used to provide a recharging source for one or more batteries within the apparatus 10. The cell 82 can be attached to the hub cap 12 or other part of the apparatus 10.

FIG. 5C shows an embodiment with a USB port or plug 84 that can be connected to the circuit board 36 shown in FIG. 1 or alternatively, can be used to transfer data form an external memory device known to persons skilled in the art. The apparatus can also include computer memory for use in connection with the display screen 80 or other devices.

Figure 6:
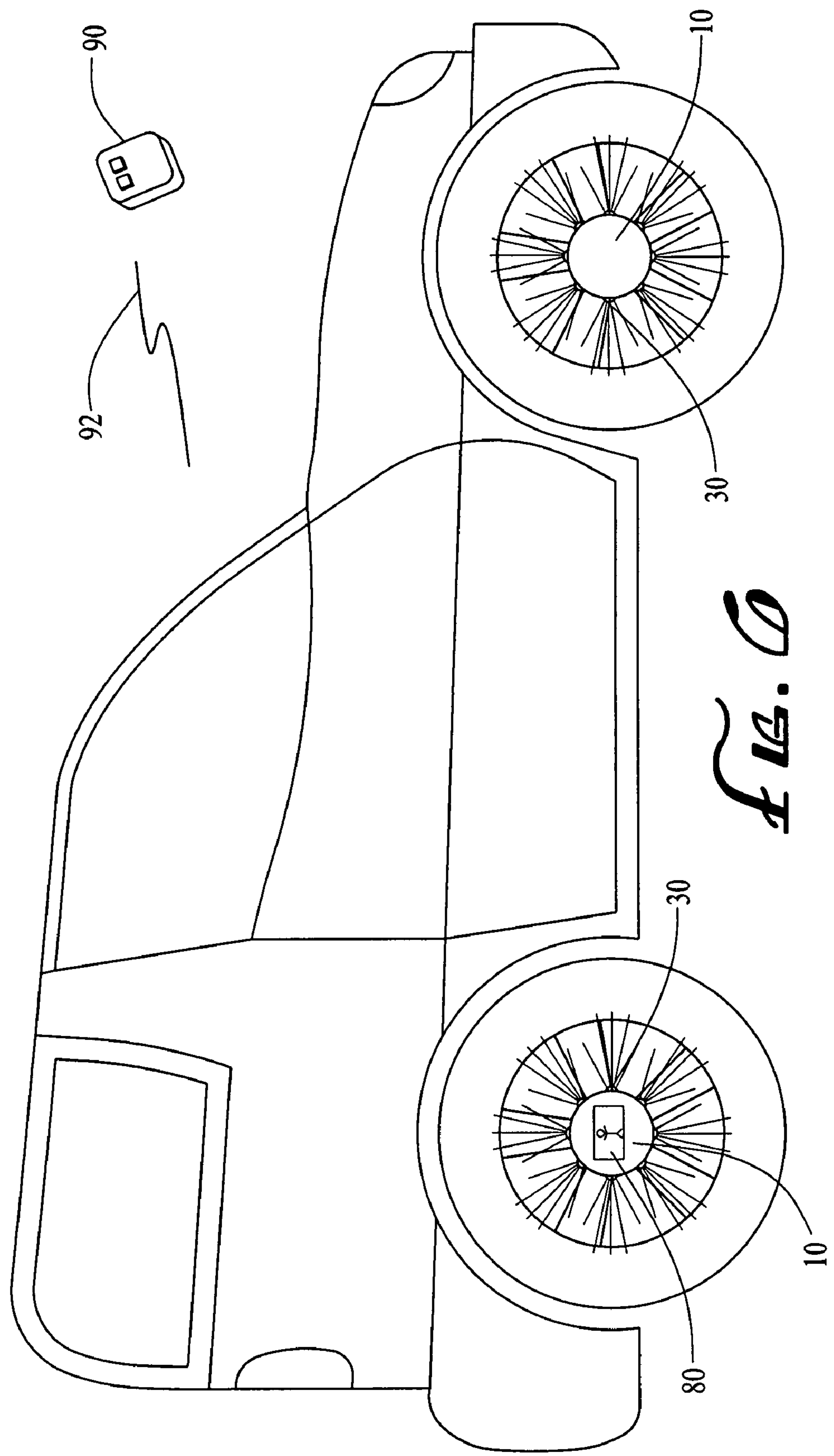
FIG. 6 is an illustration showing one or more embodiments of the illumination and display apparatus and system of the present invention for use with a wheeled vehicle.

FIG. 6 shows one embodiment with the apparatus 10 secured to a front vehicle wheel and another embodiment with the display screen 80 attached to the rear vehicle wheel. Embodiments of the invention include a remote control 90 that can be used to activate the operation of the apparatus 10, such as the illumination sources 30, the operation of the LED's or operation of the display screen 80. For example, the remote control 90 can active the illumination sources for the ON 1, ON 2 and OFF operation. The remote control 90 includes the use of any portable wireless devices that can transmit control signals 92 to a receiver operably connected to the apparatus 10 in a manner known to persons skilled in the art.

While the present invention has been described with regards to particular embodiments, it is recognized that additional variations of the present invention including any and all equivalents may be devised without departing from the invention which includes the full breadth and scope of the appended claims.

What is claimed is:

1. A quick release display system illuminating hub cap apparatus comprising:

a housing member, configured to removably attach to a plurality of wheel lug bolts by a quick release mechanism;

an electrical circuit mounted within said housing member and comprising a power source and a light assembly electrically connected to the electrical circuit for providing controlled illumination from the light assembly; and the quick release mechanism comprising a biasing cam having a locked position, the biasing cam operably connected to lock shafts such that the lock shafts are biased to lock onto the wheel lug bolts when the biasing cam is in the locked position and controlled movement of the biasing cam out of the locked position causes the lock shafts to unlock from the wheel lug bolts to allow the housing member to be removed therefrom.

2. The apparatus of claim 1 wherein each of the lock shafts is operable biased to an adjoining wheel lug bolt by a biased spring and a cam follower.

3. The apparatus of claim 1 wherein the housing member comprises a hub backing plate and hub base.

4. The apparatus of claim 3 wherein the hub backing plate and the hub base are separated by ball bearings.

5. The apparatus of claim 1 wherein the biasing cam is operable by a cylinder lock positioned within an aperture in the housing member.

6. The apparatus of claim 1 further comprising a display cap attached to the housing member.

7. The apparatus of claim 1 wherein the light assembly comprises at least one LED secured to a directional nipple on the housing member.

8. The apparatus of claim 1 further comprising a display screen attached to the housing member.

9. The apparatus of claim 1 wherein the quick release mechanism is operable by a key coupled to the biasing cam.

10. The apparatus of claim 1 including a switch adapted to activate illumination of the light assembly and positioned externally from the apparatus.

11. The apparatus of claim 1 wherein the power source comprises a faraday device.

12. The apparatus of claim 1 wherein the power source comprises a plug and an electrical power source external to the apparatus.

13. The apparatus of claim 1 wherein the power source is rechargeable through a port on the housing member.

14. A quick release illuminating and display system attachable to a vehicle wheel comprising:

a housing member, configured to removably attach to a plurality of attachment bolts by a quick release mechanism;

an electrical circuit mounted within said housing member and comprising a power source for providing electrical power to the electrical circuit;

a display screen electrically connected to the electrical circuit for providing a controlled display of data; and the quick release mechanism comprising a biasing cam having a locking position, the biasing cam being accessible through an aperture in the housing member, the biasing cam operably in communication with at least one lock shaft such that the at least one lock shaft is biased to lock onto at least one of the attachment bolts when the biasing control cam is in the locking position and controlled rotational movement of the biasing cam out of the locking position allows for the housing member to be removed from the plurality of attachment bolts.

15. The apparatus of claim 14 wherein the attachment bolts comprise lug bolts having extended lengths to contact at least one lock shaft.

16. The apparatus of claim 14 wherein the housing member includes a USB port.

17. The apparatus of claim 14 wherein the housing member includes computer memory operably connected to the display screen.

18. The apparatus of claim 17 wherein data exchanged between an external recording device and the computer memory is for display of the data on the display screen.

19. The apparatus of claim 14 including a switch adapted to activate the display of data on the display screen and is activated by a remote control.

20. The apparatus of claim 14 wherein the biasing cam is operable by a cylinder lock positioned within the aperture in the housing member.

* * * * *